(12) United States Patent
Logan

(10) Patent No.: US 6,788,766 B2
(45) Date of Patent: Sep. 7, 2004

(54) METHODS AND APPARATUS FOR PROVIDING LOCATION DEPENDENT CELLULAR TELEPHONE COMMUNICATIONS

(76) Inventor: James D. Logan, 81 Castle Hill Rd., Windham, NH (US) 03087

( * ) Notice: Subject to any disclaimer, the term of this patent is extended or adjusted under 35 U.S.C. 154(b) by 161 days.

(21) Appl. No.: 10/160,711

(22) Filed: May 31, 2002

(65) Prior Publication Data

US 2002/0181684 A1 Dec. 5, 2002

Related U.S. Application Data

(60) Provisional application No. 60/295,404, filed on Jun. 2, 2001.

(51) Int. Cl.[7] .............................................. H04M 1/64
(52) U.S. Cl. .................................. 379/67.1; 379/88.22
(58) Field of Search .................... 379/67.1, 76, 201.01, 379/88.22

(56) References Cited

U.S. PATENT DOCUMENTS 5,561,704 A * 10/1996 Salimando ................... 379/58

* cited by examiner

Primary Examiner—Creighton Smith
(74) Attorney, Agent, or Firm—Charles G. Call

(57) ABSTRACT

Methods and apparatus for establishing a telephone connection with a telephone station set located near to a desired location. Participating telephone users submit log-in data containing their current geographic location, their telephone number and a designation of the service or function they provide. Users submit requests specifying a desired location, a range value, and a desired service and obtain a response identifying participants who are currently located within the stated range of the desired location that perform the desired service, enabling the requestor to establish a telephone connection with the desired party.

19 Claims, 1 Drawing Sheet

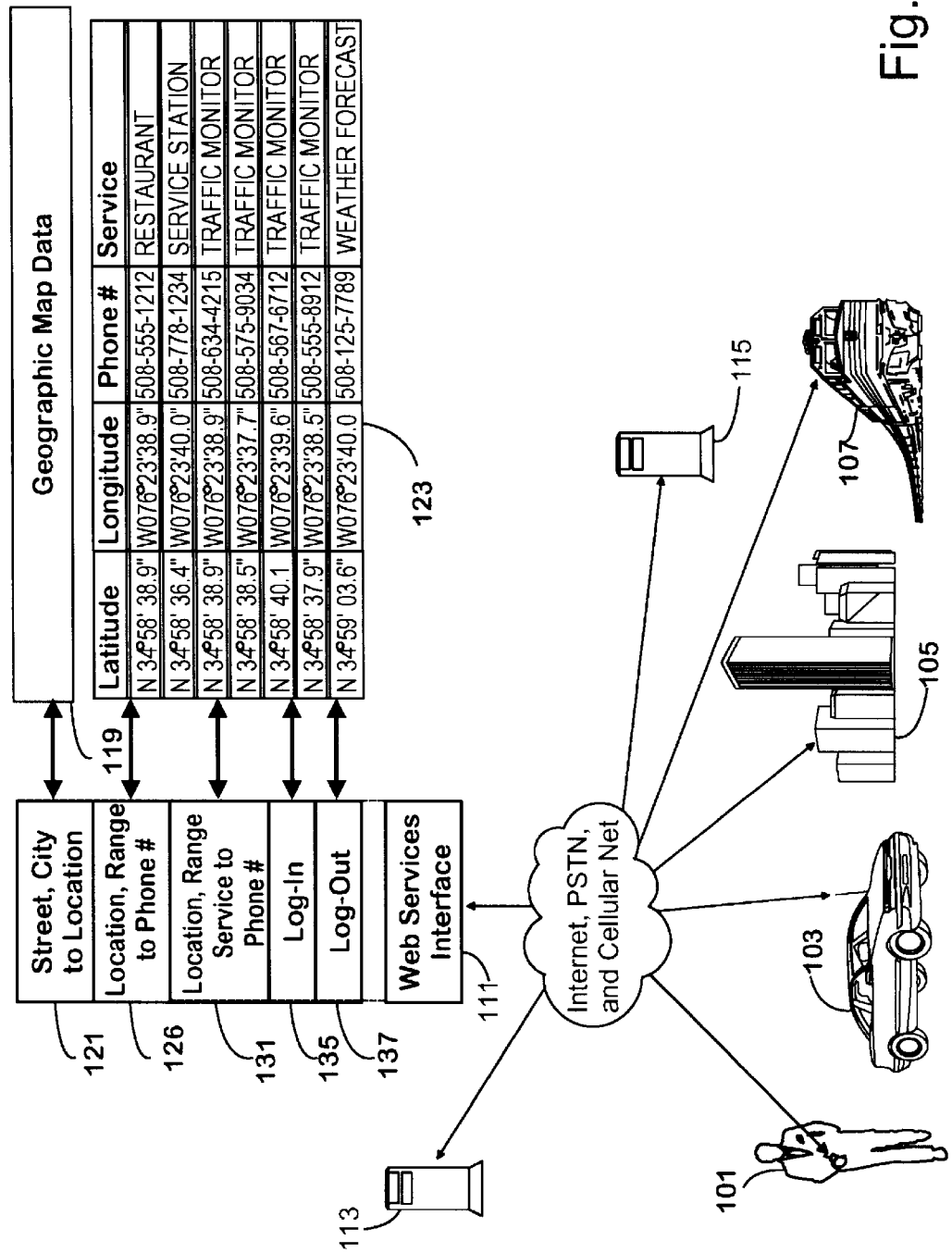

METHODS AND APPARATUS FOR PROVIDING LOCATION DEPENDENT CELLULAR TELEPHONE COMMUNICATIONS

FIELD OF THE INVENTION

This invention relates to electronic communication systems and more particularly to systems for establishing telephone connections between parties based on their locations.

SUMMARY OF THE INVENTION

The present invention takes the form of methods and apparatus for facilitating telephone communications between parties based in whole or in part on the location of one or more of those parties.

It is an object of the invention to permit a telephone user, including particular a cellular telephone user, to establish a communication link with another parties based on that party's location.

It is a related object of the invention to permit a telephone user to easily retrieve and dial the telephone number of a desired party by specifying the location of that party.

As contemplated by the invention, a virtual communications network is created between a group of consenting participants, each of which transmits a first message to a central location identifying that participant's telephone number, its geographic location, and additional descriptive information characterizing the party.

Queries may then be submitted to the central location specifying a desired location and a further desired characteristic of a desired called party, and the central location may then respond with one or more telephone numbers and descriptive information which will enable communications to be established via the cellular and/or public switched telephone network.

These and other objects, features, and applications of the present invention may be more clearly understood by considering the following detailed description and the attached drawing.

BRIEF DESCRIPTION OF THE DRAWING

FIG. 1 is a block diagram illustrating the manner in which telephonic communications based on location are established as contemplated by the invention.

DETAILED DESCRIPTION

FIG. 1 illustrates a communications network which may be used to implement the invention. A number of different participants are illustrated, including a cellular phone user 101, a mobile cellular phone user 103, a stationary phone user in an office building 105, a cellular phone user on a train 107, and three data servers 111, 113 and 115. Each of the telephone users 101, 103, 105 and 107 employs a communications device which can communicate over the cellular and/or public switched telephone network, and through that nework and the facilities offered by an Internet Services Provider, may also exchange data with any of the data servers 111, 113 or 115.

The server 111 further supports log-in and lag-out messages in which a participant posts its current location, telephone number and offered service to the database 123. Upon accepting the log-in data, the server returns a record number to the participant. The participant can thereafter log-out, canceling its participation, by sending a log-out request which includes the supplied record number. At log-in time, the participant may further state the time during which the log-in data should remain in effect. Mobile participants may update their location data frequently by posting a location update request (this update may be posted automatically whenever the mobile participant moves by more than a predetermined amount from its last posted location.

The cellular phones typically include built-in GPS (Global Positioning System) receivers for continuously or periodically updating location data for that device which is stored in the table 123. For details on the Global Positioning System and GPS receivers, see Understanding GPS: Principles and Applications by Elliott D. Kaplan (Editor), Artech House; ISBN 0890067937 (1996). In addition, Mobile Positioning Systems (MPS) incorporated into cellular phone systems provide a mechanism for periodically updating location information for those devices. MPS technology is similar to the satellite-based Global Positioning Systems (GPS) but offers the additional capability of determining location inside buildings, parking garages and other shielded areas such as inside a pocket or briefcase that are inaccessible to GPS systems. MPS Mobile Positioning Systems for mobile phones are offered by Ericsson, Nokia cellPoint, SnapTrack, Cell-loc, Cambridge Positioning System, and others.

The cellular phones typically include built-in GPS (Global Positioning System) receivers for continuously or periodically updating location data for that device which is stored in the table 123 For details on the Global Positioning System and GPS receivers, see *Understanding GPS:Principles and Applications* by Elliott D. Kaplan (Editor), Artech House; ISBN 0890067937 (1996). In addition, Mobile Positioning Systems (MPS) incorporated into cellular phone systems provide a mechanism for periodically updating location information for those devices. MPS technology is similar to the satellite-based Global Positioning Systems (GPS) but offers the additional capability of determining location inside buildings, parking garages and other shielded areas such as inside a pocket or briefcase that are inaccessible to GPS systems. MPS Mobile Positioning Systems for mobile phones are offered by Ericsson, Nokia. cellPoint, SnapTrack, Cell-loc, Cambridge Positioning System, and others.

The location data provided by GPS and MPS systems specifies the geographic "point" position of each phone. Request messages sent to the server 111 may include precise point data when available, or may approximate a position by specifying defined regions which contain the objects. Preferably, location data and mapping data is stored in a standard format, such as that used by the locator feature in Oracle8i(or later) and its spatial geometry format, a component of the Oracle 8i™ database available from Oracle Corporation, Redwood Shores, Calif. Oracle Spatial and its extensions as used with the Oracle8i Enterprise Edition provides an integrated set of functions and procedures that enables spatial data to be stored, accessed, and analyzed quickly and efficiently in an Oracle8i database. Oracle Spatial provides a SQL schema and functions that facilitate the storage, retrieval, update, and query of collections of spatial features in an Oracle8i database, and includes a set of operators and functions for performing area-of-interest and spatial join queries. See tje Oracle Spatial User's Guide and Reference, Release 8.1.6, (Oracle Part No. A77132-01), 1997, 1999. The Oracle8i Spatial products use the geocoding process for converting an address or street intersection information into a geographical location specified by a latitude and longitude. Oracle8i Spatial may accordingly be used to support web-based searches by proximity from a given location and is designed to facilitate tasks such as supplementing business information with a location attribute (latitude and longitude) and to perform distance queries, and to present a graphical representation of locations for easier visualization by users.

The arrangement shown in FIG. 1 can be employed to support a variety of new and useful applications as described below:

The popularity of CB radios resulted from people's willingness to talk to strangers that they would never have to meet. Because the radios only went so far, the audience on any one channel was always geographically related, so the conversation often tended to be about some geographical subject—like where the the highway speed traps were located.

As contemplated by the present invention, the cellular telephone network could be turned into a form of communication similar to the old CB radios where people might talk to strangers based solely on the fact that the other party was at the right place at the right time. Because cellular telephones are often "location aware," either because the phone was equipped with a GPS, MPS or some other location sensing mechanism, a system may be implemented in which the "sender" would specify a location to "canvass", and then "broadcast" a "message" to anybody (but nobody in particular) in that geographical region. The "recipient" of the broadcast would be a member of this network that had agreed to participate (agreeing to send and "answer" messages).

What might the applications for such a system be? Let's consider traffic for one. The problem with today's traffic information is that it is broadcast too infrequently and isn't specific or up to date enough. If you were signed up with a cellular traffic reporting network, however, you'd be able to call another member who is further down the route then you are and talk anonymously with that person. For instance, when I left my house every morning for work, I might broadcast a call to the 495/93 intersection a previously stored location on my phone. I'd ask anybody who answered what the traffic was like there and if there were any backups on the way. If there were I'd take the back roads to work.

Or you could have a list of frequently visited spots, or spots you might go to. You'd punch in the code for chatting with anybody in Lincoln NH and ask, "Are there long lift lines at Loon today". An answer would come back from someone on the slopes with a GPS-equipped phone, "I've been waiting in this damn line for 20 minutes". This would be a little bit like the Nextel phone but for the general public.

How would people contact each other? A beep might sound in some random number of drivers in the 495/93 area when a broadcast was sent out, into the area where info was required, until someone picked it up and commented. Alternatively, a "barge in" system might work, where a voice is the initial alert. (That is how my voice mail system announces incoming calls in my car now.)

How would you protect any potential "free-rider" problem? The system might ration out how often any one driver was bothered for information. In fact, a tit-for-tat system could monitor any freeloaders on the system—that is, you couldn't just ask for 11 info without being receptive to giving it too. And the more you ask for, the more that you'd have to give.

Perhaps just the first three seconds of a conversation could barge in to drivers within a certain distance. Then the message could be repeated to a larger circle of different cars if nobody answered, or the originator could request it if no satisfactory answer was obtained.

Of course, users could turn off the feature whenever they wanted but again, to avoid free-riding, maybe there would be mandatory reception if you had recently used the service. It could also be programmed not to barge in if you were on the phone.

Alternatively, instead of requesting information, drivers might put themselves in standby 21 mode to receive information "pushed" at them about the route that they were about to travel. When someone commented on the route they were on (as determined by the GPS locator and their known commute path), they could receive that message. In addition, they might receive a recent archive of information about the route when they first got in their car to start the trip.

To stimulate usage of the network, phone companies might not charge users for contributing to the information, but charge people to access it. These message systems could also offer two-way conversations—or even multi-party conversations. They could be then be stored for a short period for the benefit of later drivers.

A B2C type application would be if I walked into Home Depot. I would press a button (or say a command) on my phone that would indicate the location I wanted to broadcast to was the current location. I would then be patched into the Home Depot communication system—be it the current phone system, a new system they might have similar to the one the clerks use in The Gap, where they can all talk to each other at the same time via ear phones and microphones. Once a store person was on the phone I could ask the question that otherwise I'd have to find an attendant for or walk to the closest kiosk. In other words, it would be similar to letting the public in on the communication type system that The Gap has.

This last example is of a problem class I'd call the "so near, yet so far (because I can't talk to anybody)" problem. It could be a useful whenever standing in line, be it the at the airport, movie theatre, etc. In this situation, it could be thought of a directory service that automatically dials the location that you are currently in. Another example of the so near, yet so far, is trying to contact a person in the car next to you on the highway. This obviously could be desired for any number of good or bad reasons. But it might be interesting to be able to do a "stone's throw" call that would corral anybody within shouting distance.

The impulse to talk to strangers is real (and is actually thought to be genetically controlled). In Japan there is a big craze of cell phone usage where you have voice "pen pals"—teenagers that call each other on their phones but whom have never met each other and don't really know who the other caller is. Talk radio has become huge—and voice-based chat could be thought of as private talk radio. You could have buddy lists to know when worthwhile folks were "on-air" to chat with. Or even lists of people listening to the same radio station (and then pausing it when Gotuit Radio comes around) and commenting on the show.

An extension of the idea starts to morph into something similar to that Japanese gadget that many young Japanese were wearing on the street that had your personal preferences in a date programmed in. When you approached a match, a homing system kicked in. We could conceive of a similar application for this network—using the cell phone to home in on people with similar interests or matching preferences.

To truly recreate the CB craze, you'd want to link drivers together who didn't necessarily just want to exchange geographical-based info. In this case, the idea starts to resemble another—the voice chat rooms starting to emerge. The difference is that you wouldn't necessarily be on line using this system (but you could be). In that case, the participants are sorted by interest not by geography. But with our GPS system we could do an interest-based sort, too. So there some overlaps with voice chat rooms, which might need to be thought through better, but there are differences as well.

GPS-Based Message Boards and Chat

Another idea is the location-based message board. This differs from the idea expressed above in that it is asynchronous with the CB-cell phone idea is real time. The idea here is that community members (i.e. fee-paying cell phone customers) would be able to drive by any location and post messages to a voice message board. If you were going by an exit on the highway, you might access the message board for that location. You'd hear that someone is recommending a great pizza joint down the road, or that the Mobil station just ahead has clean bathrooms or that around the next turn is a historic place. The system would use a rating system to cleanse the system of worthless comments. Comments that were not listened to in their entirety would be pushed to the bottom of the list or deleted.

To make this type of message board work, you'd have to have additional identification information beyond just the location (as there could be multiple pizza stores at an intersection). A nice technology to handle this problem is voice and some natural language processing. For instance, I could be driving down 95 and say "Coffee shops". This would be interpreted and take me to the proper place in the message board network. (In a similar vein, I'm sure the phone companies or TellMe Networks are working on directory services based on voice. The distinction here would be the database of public comments organized in message board format. Sort of like an audio epinions. We might also build in a time-scale modification feature so the speech could be sped up in these time shifted venues.

Michelin guides could buy space on these boards and post their information. Businesses could post location-based ads. Local towns could put up verbal copies of their historic marker signs, which no one has the time to stop and read. The closest thing of I know of to this idea are the real estate companies that let you tune into an FM station to hear a broadcast about a house nearby.

To access the message boards for a place that you were not present at that moment, you'd have to specify a location. See the section below for Directions for some thoughts on doing that. On method not mentioned below, is that the server may know the trip you're taking—either because it's your commute or because it gave you directions. In that case, you could step through the messages "left" along your route. One of my favorite ideas here is the "radar net"—another aid for my memory as I always forget to slow down. (Sometimes I even leave my radar detector on just so the random false alarm reminds me to watch my speed.). But there are millions of other people who spend hundreds of dollars on Whistler's radar detectors to monitor the roadways for radar traps. What if all these units could talk to each other?

The idea here is that every time someone's radar unit picked up a signal, it would be matched with the car's location data (from a GPS device or the cell phone's 911) and called into a server. Users would benefit by being able to get a (revenue-generating) cell phone call moments before they were to pass a reported radar outpost. This would be particularly handy for the new laser systems against which the Whistlers aren't so effective.

The system would also use a neural net to detect, and screen out, the false alarms often generated by electronic road signs, and to stop sending out alarms from sites that seem to have gone quiet. And of course a database would be built up over time of the favorite hangouts for radar guns—just so the first guy through doesn't get nailed. Eventually, these radar systems will get smarter and interface more directly with the car's systems. With GPS data, they could offer a feature of not generating their annoying signal if the car is going at a legal speed (based on the GPS signal and a database of allowed speeds). The device could also be turned off if it going past a known false alarm. The idea of a database of speed limits is an interesting one. If one were developed, this would obvious uses when combined the accurate-enough GPS data. Teenagers as well as fleet drivers could be monitored for speeding. If the GPS data was not precise enough to pinpoint exactly which road the vehicle was on (the highway or the side access road), reasonable deductions could be made to catch most speeding activities.

It is to be understood that the implementation and potential applications which have been described are merely illustrative, and that numerous modifications may be made to the methods and apparatus described without departing from the true spirit and scope of the invention.

What is claimed is:

1. A data server for facilitating communication between consenting participants via a telephone network said data server comprising, in combination, a database for storing cross-referencing data that specifies, for each of given one of said participants, the current geographic location of said given participant and the telephone number of said given participant, means for receiving log-in messages from a new participant, said log-in message containing data specifying the current geographic location of said new participant and the telephone number of said new participant, means for posting the data contained in each of said log-in messages in said database, means for receiving a broadcast request from a requesting one of said participants, said broadcast request specifying a geographic region within which a targeted subset of said participants are currently located, means responsive to said broadcast request for submitting a query to said database to obtain the telephone numbers of each participant in said targeted subset of said participants, and means for broadcasting an information message via said telephone network to each of said telephone numbers.

2. A data server as set forth in claim 1 further including means for receiving an update message from a current one of said participants and for altering the cross-referencing data for said current one of said participants in response to said update message.

3. A data sewer as set forth in claim 2 wherein said current one of said participants is a mobile and wherein said update message specifies an new current geographic location for said current participant.

4. A data server as Set forth in claim 3 wherein said update message that specifies a new current geographic location for said current participant is automatically generated whenever said current one of said participants moves by more than a predetermined distance from the geographic location previously specified for said current one of said participants in said database.

5. A data server as set forth in claim 4 wherein said new current geographic location is automatically generated using the Global Positioning System (GPS) or the Mobile Positioning System (MPS).

6. A data server as set forth in claim 5 wherein said new current geographic location is automatically generated whenever said current one of said participants moves by more than a predetermined distance from the current geographic location previously specified by said cross-reference data for said current participant.

7. A data server as set forth in claim 1 wherein said current geographic location data of each given one of said participants is geographic point data specifying the latitude and longitude of the current location of said given one of said participants.

8. A data server as set forth in claim 7 where said geographic point data is generated by a position location device at said current location of said given one of said participants.

9. A data server as set forth in claim 8 wherein said position location device employs the Global Positioning System (GPS) or the Mobile Positioning System (MPS).

10. A data server as set forth in claim 1 wherein said information message contains a request for a response and wherein said data server establishes a connection via said telephone network between said requesting participant and the first participant in said target subset to respond to said request for a response.

11. A data server as set forth in claim 10 wherein said connection is a multi-party connection established between said requesting participant and a plurality of participants in said target subset that respond to said request for a response.

12. A data server as set forth in claim 1 wherein said cross-referencing data further specifies one or more services or functions performable by at least some of said participants, wherein said broadcast request message further specifies a desired service or function, and wherein said targeted subset of said participants is limited to those participants located in said geographic region that perform said desired service or function.

13. The method of sharing information via a telephone network between consenting participants comprising, in combination, the steps of:

establishing a database which contains descriptive information about a plurality of active participants, said descriptive information including the telephone number and the geographic location of each of said active participants, accepting a log-in request from a formerly inactive participant and in response thereto including said formerly inactive participant in said plurality of active participants, accepting a log-off request from a withdrawing active participant to thereafter exclude said withdrawing participant from said plurality of active participants, accepting a broadcast message from an active one of said participants directed to a specified target geographic region, consulting said database to obtain the telephone numbers of active participants whose geographic location is within said target geographic region, and relaying said broadcast message via the telephone network to said telephone numbers.

14. The method of sharing information via a telephone network between consenting participants as set forth in claim 13 further including the steps of:

accepting an update message from a particular one of said active participants and altering the descriptive information in said database for said current participant in response to said update message.

15. The method of sharing information via a telephone network between consenting participants as set forth in claim 14 wherein said particular one of said active participants is mobile and wherein said update message specifies a new current geographic location for said particular one of said active participants.

16. The method of sharing information via a telephone network between consenting participants as set forth in claim 13 wherein said geographic location data of each of said active participants is geographic point data specifying the latitude and longitude of the current location of said current participant.

17. The method of sharing information via a telephone network between consenting participants as set forth in claim 13 wherein said target geographic region is defined by the combination of the specification of a geographic point and a maximum distance from said geographic point.

18. The method of sharing information via a telephone network between consenting participants as set forth in claim 13 wherein said broadcast message contains a request for information and wherein said method further includes the step of establishing a communication link via said telephone network between the active one of said participants from whom said broadcast message was accepted and one other active participants that indicate a willingness to respond to said request for information.

19. The method of sharing information via a telephone network between consenting participants as set forth in claim 13 wherein said descriptive data further specifies one or more desired services or functions performable by at least some of said participants, wherein said telephone numbers obtained by said step of consulting said database are further limited to the telephone numbers of active participants who perform said desired services of functions.

* * * * *